United States Patent Office 3,446,835
Patented May 27, 1969

3,446,835
PREPARATION OF METHIONINE NITRILE
AND METHIONINE
Jozef A. Thoma, Vaals, and Johannes W. Gielkens,
Sittard, Netherlands, assignors to Stamicarbon
N.V., Heerlen, Netherlands
No Drawing. Filed June 28, 1965, Ser. No. 467,757
Claims priority, application Netherlands, July 4, 1964,
6407632
Int. Cl. C07c 149/24, 121/02, 149/14
U.S. Cl. 260—465.5                                3 Claims

ABSTRACT OF THE DISCLOSURE

A process for the conversion of β-methylmercaptopropionaldehyde into γ-methylmercapto-α-aminobutyronitrile in one stage, using ammonia and a cyanide, is disclosed, wherein the aqueous reaction medium in which the conversion is carried out is maintained saturated with ammonia at all times during the reaction. The nitrile product may then be hydrolyzed to produce methionine.

---

The present invention relates to a process for the preparation of methionine. More particularly the invention relates to certain improvement in the preparation of methionine by first converting β-methylmercaptopropionaldehyde with a cyanide and ammonia or an appropriate ammonium salt into γ-methylmercapto-α-aminobutyronitrile, followed by hydrolysis of the aminonitrile. "Cyanide" includes hydrogen cyanide.

There have been various prior proposals for carrying out the above-mentioned process. Thus, according to one prior method (see United States Patent No. 3,131,210) the β-methylmercaptopropionaldehyde is converted, at temperatures between —10 and 50° C., into the aminonitrile in an excess of anhydrous, liquid ammonia with the aid of an alkali metal cyanide and ammonium chloride. Due to the fact that liquid ammonia is used as solvent, the conversion must be carried out at elevated pressure using the temperatures involved. Consequently, the method is costly due to the large amount of energy required, and, moreover, due to the necessity of the recovery of large amounts of ammonia.

According to another method (British Patent No. 892,-755), the conversion of β-methylmercaptopropionaldehyde into the aminonitrile is carried out with an excess of ammonia and hydrogen cyanide in an alcoholic solution which must not contain more than 5% by weight of the aldehyde to be converted. A drawback of this method is the treatment of the ammonia-containing alcohol used, which, due to the necessarily low aldehyde concentration, is present in a large amount compared with the amount of aminonitrile formed. In addition, the pressure required in this method may also be as high as 40 atmospheres.

The principal object of the present invention is to provide a process of the type indicated which is free from the prior art problems mentioned above. Other objects will also be hereinafter apparent.

Broadly stated, the present process involves converting the β-methylmercaptopropionaldehyde into γ-methylmercapto-α-aminobutyronitrile in an aqueous reaction medium while ensuring that at all times during the conversion the reaction medium is kept saturated with ammonia. This conversion is usually carried out at a temperature between 0 and 75° C. Preferably, however, a temperature between 45 and 55° C. is used as this gives optimum results as regards reaction rate and yield.

According to the invention, the said conversion may be carried out continuously or as a batch process at normal pressures and high aldehyde concentration, e.g., at a concentration of 50 g. (and up to about 140 g.) of aldehyde per 100 milliliters of water.

The conversion into the aminonitrile is preferably carried out with gaseous liquid or dissolved hydrogen cyanide. It is also possible, however, to use ammonium cyanide or another cyanide, e.g., an alkali metal cyanide, or the like, mixed with an appropriate ammonium salt, e.g., ammonium chloride instead of hydrogen cyanide.

Saturation of the reaction medium with ammonia during the conversion can be achieved in a simple way by introducing gaseous ammonia.

After the aldehyde has been converted into the aminonitrile, the aminonitrile is hydrolyzed to give the desired methionine. All of the reaction mixture can be subjected to the hydrolysis if desired. However, the present invention allows first separating the reaction mixture into a layer rich in aminonitrile and a layer rich in water by cooling it to, for instance, 20° C., and thereafter hydrolyzing the former layer and returning the latter layer into the process. The water-rich layer is saturated with ammonia, so that recirculation of this layer makes it possible to introduce less ammonia in the reaction medium for the conversion into aminonitrile. Less acid is also needed in the hydrolysis if this is to be carried out in an acid medium. The amount of ammonium salt obtained as a by-product per given weight of methionine will then be considerably smaller than in the case where all of the reaction mixture is subjected to hydrolysis.

The hydrolysis is normally effected in an acid medium with the aid of hydrochloric acid or sulphuric acid. Sulphuric acid is preferred, however, as this gives a higher yield.

The process according to the invention is illustrated but not limited by the following examples.

EXAMPLE 1

125 ml. of water saturated with ammonia and 15 g. of hydrocyanic acid were brought together in a reaction vessel provided with a stirrer. The mixture was heated to about 45° C. with simultaneous introduction of gaseous ammonia. At that temperature, 52 g. of β-methylmercaptopropionaldehyde were added and the resulting mixture was kept at this temperature for 1 hour. During this period, the reaction mixture was kept saturated with ammonia by introduction of gaseous ammonia. After cooling, all of the reaction mixture was slowly added, simultaneously with 215 g. of 98% by weight sulphuric acid, to 80 g. of 60% by weight sulphuric acid, while the temperature was at all times kept below 30° C. The mixture was then heated under reflux for 2 hours, after which it was cooled and its pH increased to about 5.5 by addition of ammonia. After cooling, the methionine and ammonium sulphate crystallized out were filtered and washed with mother liquor from a previous methionine crystallization. To discolor the washed methionine crystals, the crystals were then dissolved in an additional quantity of the said mother liquor and boiled with activated carbon. The carbon was filtered off while hot, and the filtrate was cooled. Methionine crystallized out, and mother liquor was obtained, which was used in a following run. The output was 65.5 g. of methionine of 99.3% purity, thus corresponding to a yield of 87% with reference to β-methylmercaptopropionaldehyde. Per gram of methionine, there were formed 5.37 grams of $(NH_4)_2 \cdot SO_4$.

EXAMPLE 2

250 ml. of water saturated with ammonia and 30 g. of hydrocyanic acid were brought together in a reaction vessel provided with a stirrer. The mixture was heated to about 50° C. with simultaneous introduction of gaseous ammonia. At that temperature, 104 g. of β-methylmercaptopropionaldehyde were added, and the resulting mixture was kept at this temperature for 1 hour. During that period, the reaction mixture was kept saturated with ammonia by introduction of gaseous ammonia.

The reaction mixture was then separated into two liquid layers by cooling it to 25° C. The water-rich upper layer which contained 56 g. of the aminonitrile formed, was separated from the bottom layer containing 74 g. of the aminonitrile, and used as reaction medium in a subsequent conversion of β-methylmercaptopropionaldehyde.

The bottom layer was then slowly added, simultaneously with 60 g. of 98% by weight sulphuric acid, to 240 g. of 50% by weight sulphuric acid, while the temperature was all the time kept below 30° C. After that, the mixture was heated under reflux for 1 hour, and then treated in the way described in Example 1. The output was 74.5 g. of methionine of 99.1% purity, which corresponds to a yield of 87% with reference to the β-methylmercaptopropionaldehyde from which the aminonitrile contained in the bottom layer had been formed quantitatively. Per gram of methionine, there were formed 3.27 grams of $$(NH_4)_2 \cdot SO_4$$

It will be recognized that various modifications may be made in the invention without departing from the spirit and scope thereof as set out in the following claims.

We claim:

1. A process for the conversion of β-methylmercaptopropionaldehyde into γ-methylmercapto-α-aminobutyronitrile with ammonia and a cyanide in an aqueous reaction medium at a temperature between 0° and about 75° C., wherein a stoichiometric excess of ammonia is employed and while maintaining said aqueous reaction medium saturated with ammonia at all times during the reaction.

2. Process according to claim 1 wherein the conversion is carried out at a temperature between 45 and 55° C.

3. Process according to claim 1 wherein the said cyanide is selected from hydrogen cyanide and ammonium cyanide, and after completion of the conversion into γ-methylmercapto-α-aminobutyronitrile, the reaction liquid is cooled to separate a layer rich in aminonitrile and a layer rich in water, the layer rich in aminonitrile is hydrolized and the layer rich in water is returned to the conversion step.

References Cited

UNITED STATES PATENTS

| 2,732,400 | 1/1956 | Weiss | 260—534 |
| 3,131,210 | 4/1964 | Hügel et al. | 260—534 XR |

FOREIGN PATENTS

| 605,311 | 7/1948 | Great Britain. |

LORRAINE A. WEINBERGER, *Primary Examiner.*

A. P. HALLUIN, *Assistant Examiner.*

U.S. Cl. X.R.

260—534